United States Patent Office 3,497,720
Patented Feb. 24, 1970

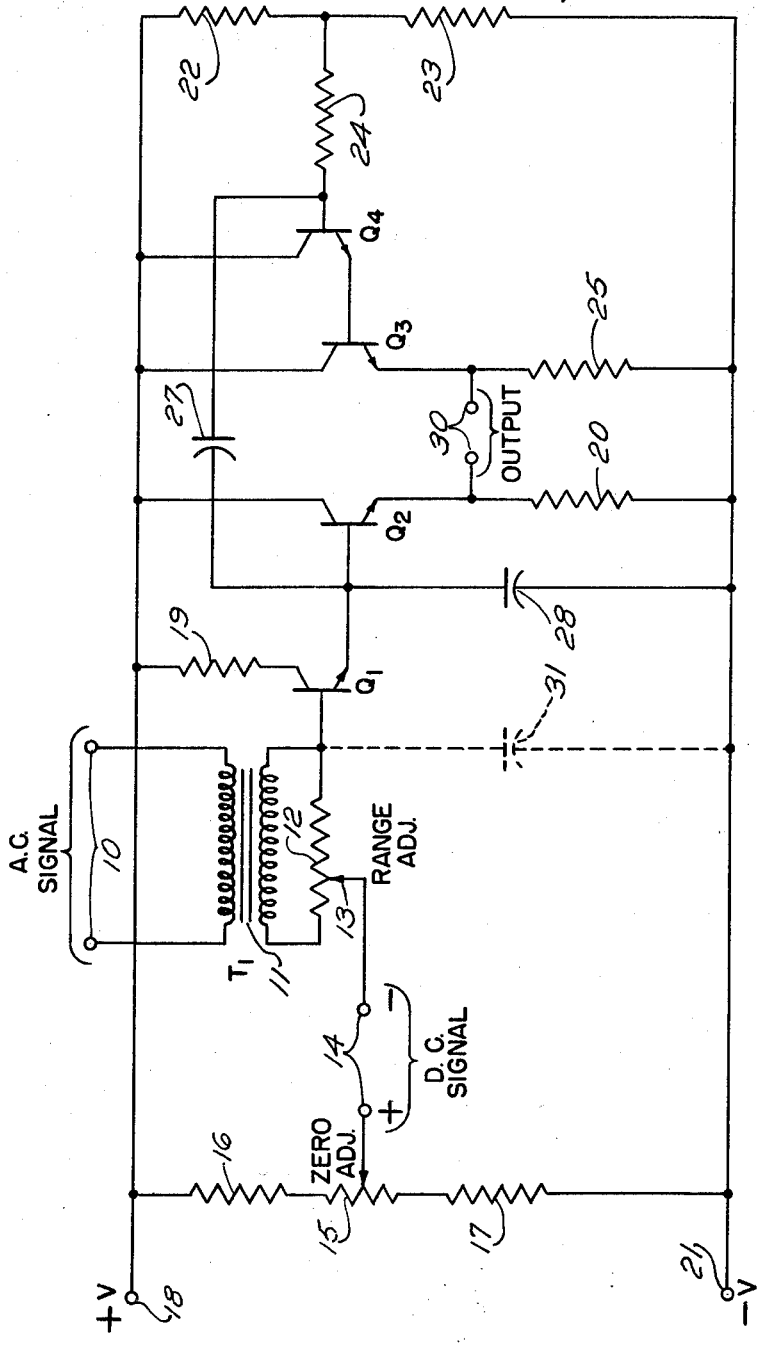

3,497,720
DEMODULATOR
Richard S. Slawson, Barrington, R.I., assignor to George W. Dahl Company, Inc., a corporation of Rhode Island
Filed Oct. 20, 1965, Ser. No. 498,305
Int. Cl. H03k 5/20
U.S. Cl. 307—235    4 Claims

ABSTRACT OF THE DISCLOSURE

A demodulator-comparator for demodulating alternating current signals to relatively pure DC signals and more particularly a demodulator which will measure and transduce the peak voltage of the AC signal to a DC signal. As disclosed means are provided to compare the DC signal output of the demodulator with an additional DC signal by having as an output the algebraic difference between the peak value of the AC signal and the value of the additional DC signal.

---

It is sometimes desirable to compare an AC signal with a separate DC signal for purposes of null detection. For example, an AC signal from a tachometer might well be compared with the output from a feedback potentiometer which would effectively be a DC signal. It has been the practice in the past to demodulate AC signals by utilizing rectification, either half-wave rectifiers or full-wave rectifiers, that are followed by the usual filtering networks that eliminate the unwanted ripple in the output from the rectifiers. It is known that diodes exhibit a definite clipping effect and this coupled with the time delays introduced by the usual filtering systems make this form of demodulation of an AC signal unsuitable when AC signals in the millivolt range, particularly at the low end of the audio frequency spectrum, are being considered. Furthermore, the size of the filters sometimes makes the circuitry impractical for modern control equipment.

It is therefore the principal object of this invention to provide a demodulator circuit which tends to cancel any ripple voltage that appears on the output thereof.

A further object of the invention is to provide a demodulator circuit in which the thermal characteristics of the rectifying components will tend to cancel one another.

Another object of the invention is to minimize the time constant of the filter network.

With these and other objects in view, the invention consists of certain novel features of construction as will be more particularly described and pointed out in the appended claims.

In the accompanying drawings the single figure is a diagram of my demodulator circuit shown in a configuration where the AC signal may be compared to a DC signal.

In proceeding with this invention, I basically take two transistors and place them in a serial condition with a capacitor where they will accomplish a half-wave rectification of the AC signal. For example, the AC signal on the base of $Q_1$ is rectified at the emitter. I then take two additional transistors and place them in a similar arrangement with a cross coupling so as to provide DC balancing and ripple cancellation.

Referring to the drawing, an AC input signal to be detected is applied at the input terminals 10 which are the primary of a transformer 11, the secondary of which has a resistance in the form of a potentiometer 12 connected thereacross. The transformer 11 is useful to provide isolation of the AC input signal source but may be eliminated if there would be no problems created by directly coupling the AC signal across resistance 12. Resistance 12 is connected to the base of transistor $Q_1$ and if we consider the DC signal input terminals 14 as being shorted, the base of transistor $Q_1$ is biased through a network of resistors 15, 16 and 17 to a positive voltage source applied to the terminal 18. The collectors of transistors $Q_1$ and $Q_2$ are coupled together and to the positive voltage source applied to terminal 18, and the emitter of transistor $Q_1$ is directly connected to the base of transistor $Q_2$, the emitter of transistor $Q_2$ being coupled through an output resistance 20 to a negative voltage source applied at terminal 21. To insure that the current rating of the collector of transistor $Q_1$ is not exceeded, a resistance 19 is inserted in series therewith.

A similar circuit is provided by transistors $Q_3$ and $Q_4$, whose collectors are connected together and to a positive voltage source applied to terminal 18. The base of transistor $Q_4$ is biased by a low impedance voltage divider consisting of resistors 22 and 23 and the base is connected to the junction of these two resistors by a large resistance 24, the purpose of which is to make the base of transistor $Q_4$ a high impedance point. As in the other circuit, the emitter of transistor $Q_4$ is connected to the base of transistor $Q_3$ and the emitter of transistor $Q_3$ is connected to a negative voltage source applied at terminal 21 through an output resistance 25. A capacitor 27 couples the base of transistor $Q_4$ to the base of transistor $Q_2$. The purpose of capacitor 27 is to transfer to the base of transistor $Q_4$ any ripple voltage appearing at the base of transistor $Q_2$. Connected from the base of transistor $Q_2$ to the negative voltage source at terminal 21 is a filter capacitor 28.

Disregarding for the moment any balancing function that is possible in this circuit and considering the terminals 14 shorted, it will be seen that the AC voltage appearing at the base of $Q_1$ is rectified by the emitter diode of $Q_1$ in half-wave fashion with a usual filter capacitor connected to the output of the rectifier, which is capacitor 28. Further, the emitter of transistor $Q_3$ follows the base of transistor $Q_4$ and the emitter of transistor $Q_2$ follows the base of transistor $Q_2$. Any ripple voltage that appears at the base of transistor $Q_2$ (from the half-wave rectification action) is adequately coupled through capacitor 27 to the base of transistor $Q_4$ and will not appear in the output taken across the emitters of transistors $Q_2$ and $Q_3$ as at terminals 30 since any ripple voltage that appears on the emitter of transistor $Q_2$ is in phase with the ripple voltage that appears on the emitter of transistor $Q_3$. The response of this circuit is dependent on two factors, namely the rate of charging of the capacitor 27 through the resistor 24 and the rate of discharging of capacitor 28 through the high impedance base of transistor $Q_2$, together with the rate of discharge of capacitor 27 through resistors 22 and 24 and the base of transistor $Q_2$. Accordingly, it will be seen that the time constant for a reduction in the output signal depends upon the beta value of transistor $Q_2$ as well as the capacitor and resistance networks. In practice, capacitors 27 and 28 have been selected at one microfarad, resistor 24 at 150 thousand ohms while resistor 22 and resistor 23 were kept at a low value merely to provide voltage dividing. Since it was desired to provide a low impedance output, output resistors 20 and 25 were chosen to have a value of 2000 ohms each. Since some difficulty is experienced in radio frequency noise pickup, a capacitance 31 which is shown in dotted lines may need to be placed across the input through transistor $Q_1$, the value of which should be selected to provide suitable RF bypassing, and with the impedances being worked with here a value of .02 microfarad is suitable.

To utilize the demodulator circuit as a comparison device to compare a DC signal at 14 with an AC signal at 10, the potentiometer 15 is first adjusted to zero the output appearing at terminals 30. A variable DC signal may then be applied at terminals 14 which DC signal is effectively in series with the base biasing circuit of transistor $Q_1$. It will be apparent that when this is done the emitter voltage of transistor $Q_2$ will be the sum of the direct current voltage at the arm 13 of resistance 12 plus the peak AC voltage appearing between the arm 13 of resistance 12 and the base of transistor $Q_1$ minus any voltage drops that occur across the emitter junctions of transistors $Q_1$ and $Q_2$. Similarly the emitter voltage of transistor $Q_3$ will be the instantaneous voltage at the base of $Q_4$ less the voltage drops across the emitter junctions of transistors $Q_4$ and $Q_3$. The potentiometer 15 has been shown in the circuit since it is useful for direct current balancing and zero suppression, while potentiometer 12 is useful for scaling peak voltage to RMS or average values and also for attenuating the AC input signal.

It will of course be apparent that transistors $Q_1$ and $Q_4$ should be of the same type and of matched characteristics as well as transistor $Q_2$ and transistor $Q_3$ being of the same type and of matched characteristics. Certain variations in the illustrated circuit will also suggest themselves. For example, the collectors of all transistors are shown connected together. Alternately, however, the collectors of $Q_1$ and $Q_4$ could be connected together and to one source of positive voltage while the collectors of $Q_2$ and $Q_3$ are connected together and to another source of positive voltage. Also transistors $Q_1$ and $Q_4$ could be N type base field effect transistors which give equal if not superior performance as their gate impedance is very high.

I claim:

1. A demodulator for producing a DC signal from an AC signal where the DC signal is proportional to the peack value of the AC signal comprising an input for an alternating current signal, a voltage source, output terminals, a first rectifying device connected to said input, a pair of transistors each having a base electrode, a collector electrode and an emitter electrode, a second rectifying device coupled to the output of the first rectifying device, the base of each transistor connected respectively to the output of the first and second rectifying devices, one emitter electrode connected to one output terminal and the other emitter electrode connected to the other output terminal, the collectors of said transistors connected to one side of said voltage source and the emitters coupled to the other side of said voltage source.

2. A demodulator with comparator functions as in claim 1 wherein a direct current input is provided in series with the alternating current input.

3. A demodulator comprising a source of alternating current signals, a voltage source, a pair of first and second junction transistors each having a base electrode, a collector electrode and an emitter electrode, the base of the first transistor coupled to said source and the emitter of the first transistor coupled to the base of the second transistor, a third and fourth transistor each having a base electrode, a collector electrode and an emitter electrode, the base of the third transistor coupled to the emitter of the first transistor and the emitter of the third transistor coupled to the base of the fourth transistor, the collectors of each stage being coupled to one side of a voltage source, a pair of identical resistors, output terminals being connected to the emitters of the second and fourth transistors, which in turn are coupled respectively through a said one of said resistors to the other side of a voltage source.

4. A demodulator with comparator functions as in claim 3 wherein a source of variable direct current is in series with said source of alternating current signals.

References Cited

UNITED STATES PATENTS

| | | | |
|---|---|---|---|
| 3,281,703 | 10/1966 | Bladen | 307—315 XR |
| 3,090,000 | 5/1963 | Bentley | 328—146 XR |
| 3,188,495 | 6/1965 | Grimm | 307—315 XR |
| 3,328,599 | 6/1967 | Stupar | 328—146 XR |

DONALD D. FORRER, Primary Examiner

STANLEY T. KRAWCZEWICZ, Assistant Examiner

U.S. Cl. XR

307—315; 328—146